United States Patent [19]
Oldani

[11] Patent Number: 5,185,973
[45] Date of Patent: Feb. 16, 1993

[54] AIRCRAFT OR ROAD VEHICLE TRANSPORTABLE OPERATING ASSEMBLY ADAPTED TO BE TRANSFORMED INTO A FIELD HOSPITAL, OBSERVATION POST, TRANSMISSION CENTER AND THE LIKE

[76] Inventor: Gaetano Oldani, Via Stromboli, 20, 20089, Rozzano (Milano), Italy

[21] Appl. No.: 698,490

[22] Filed: May 9, 1991

[30] Foreign Application Priority Data

Aug. 2, 1990 [IT] Italy ................................ 21176 A/90

[51] Int. Cl.$^5$ .............................................. E04H 1/12
[52] U.S. Cl. .................................... 52/64; 52/143; 52/173 R
[58] Field of Search ........................ 52/64–69, 52/143, 173 R; 296/165, 171–173, 175

[56] References Cited

U.S. PATENT DOCUMENTS

| | | | |
|---|---|---|---|
| 1,417,736 | 5/1992 | Heygate | 52/143 |
| 2,704,223 | 3/1955 | Houdart | 52/67 |
| 2,732,251 | 1/1956 | Meaker | 52/67 |
| 3,719,386 | 3/1973 | Puckett et al. | 52/67 |

FOREIGN PATENT DOCUMENTS

WO840045 1/1984 World Int. Prop. O. ............ 52/143

Primary Examiner—James L. Ridgill, Jr
Attorney, Agent, or Firm—Bucknam and Archer

[57] ABSTRACT

An aircraft or road vehicle transportable operating assembly comprises a central body, to which there are telescopically coupled side bodies which can be withdrawn into the central body, during a transportation step, and extended from the central body during the use step, the side bodies including a trampling floor which can be arranged with a coplanar relationship with respect to a trampling floor of the central body.

6 Claims, 6 Drawing Sheets

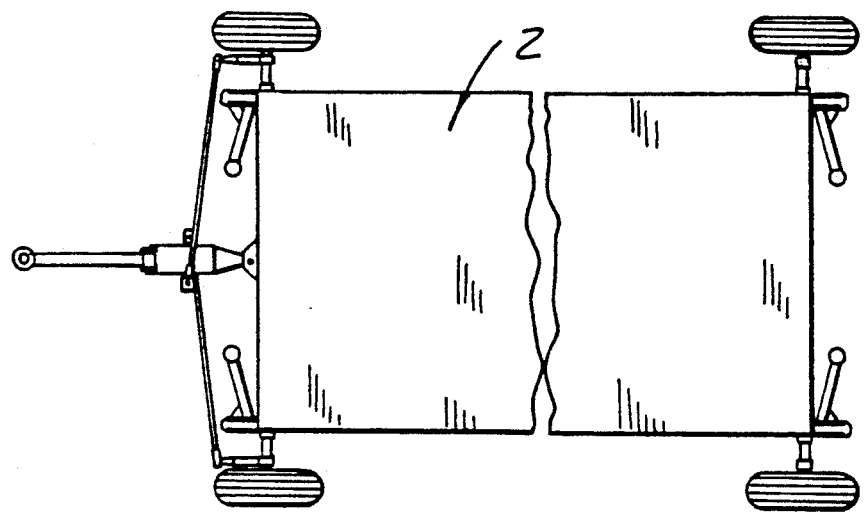
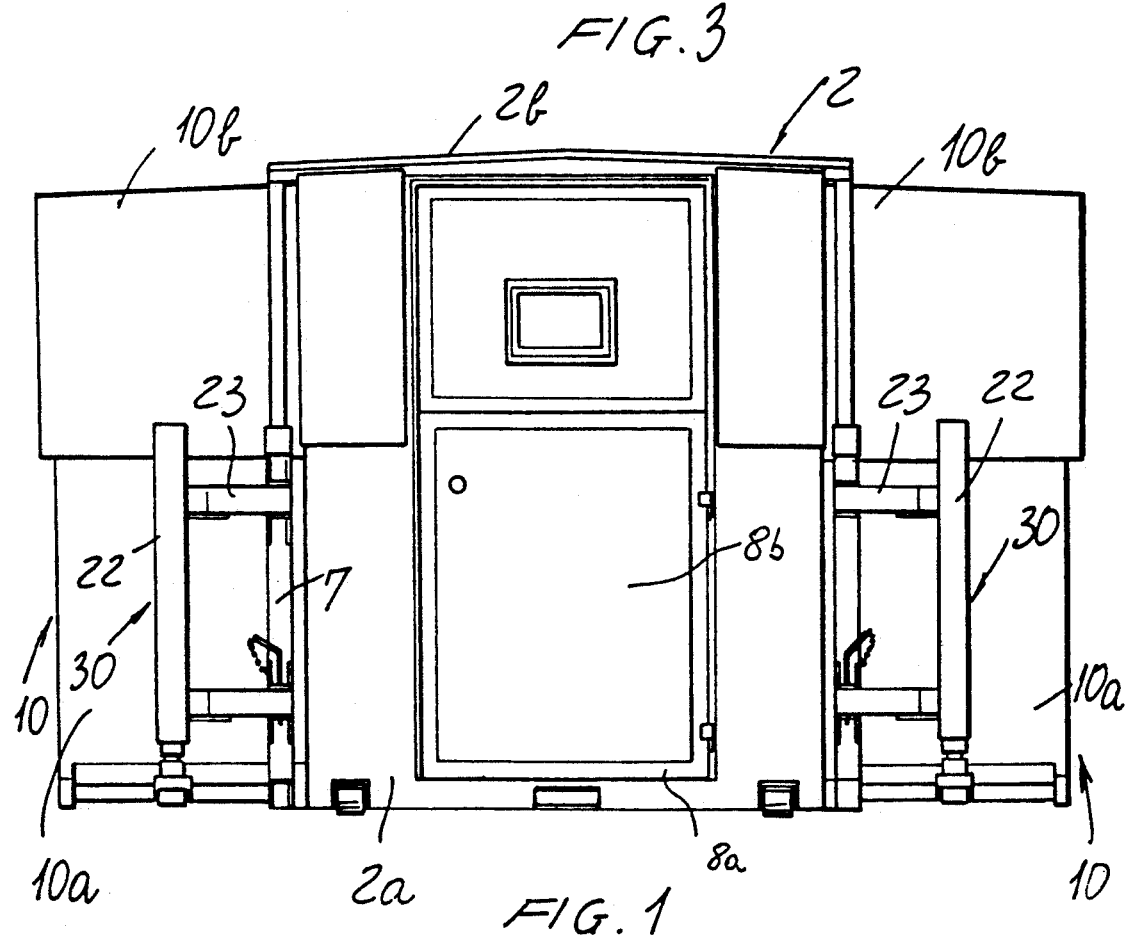

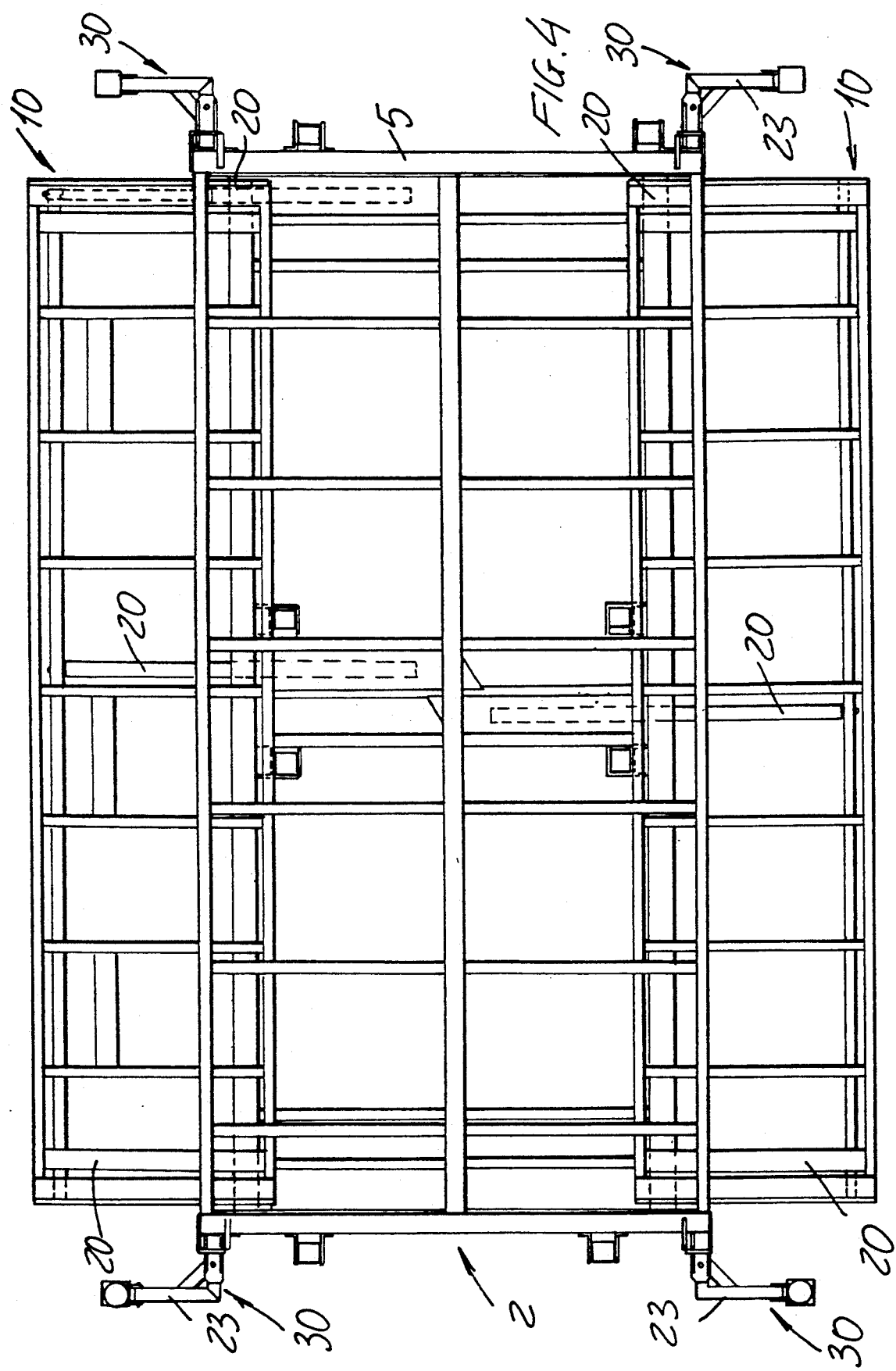

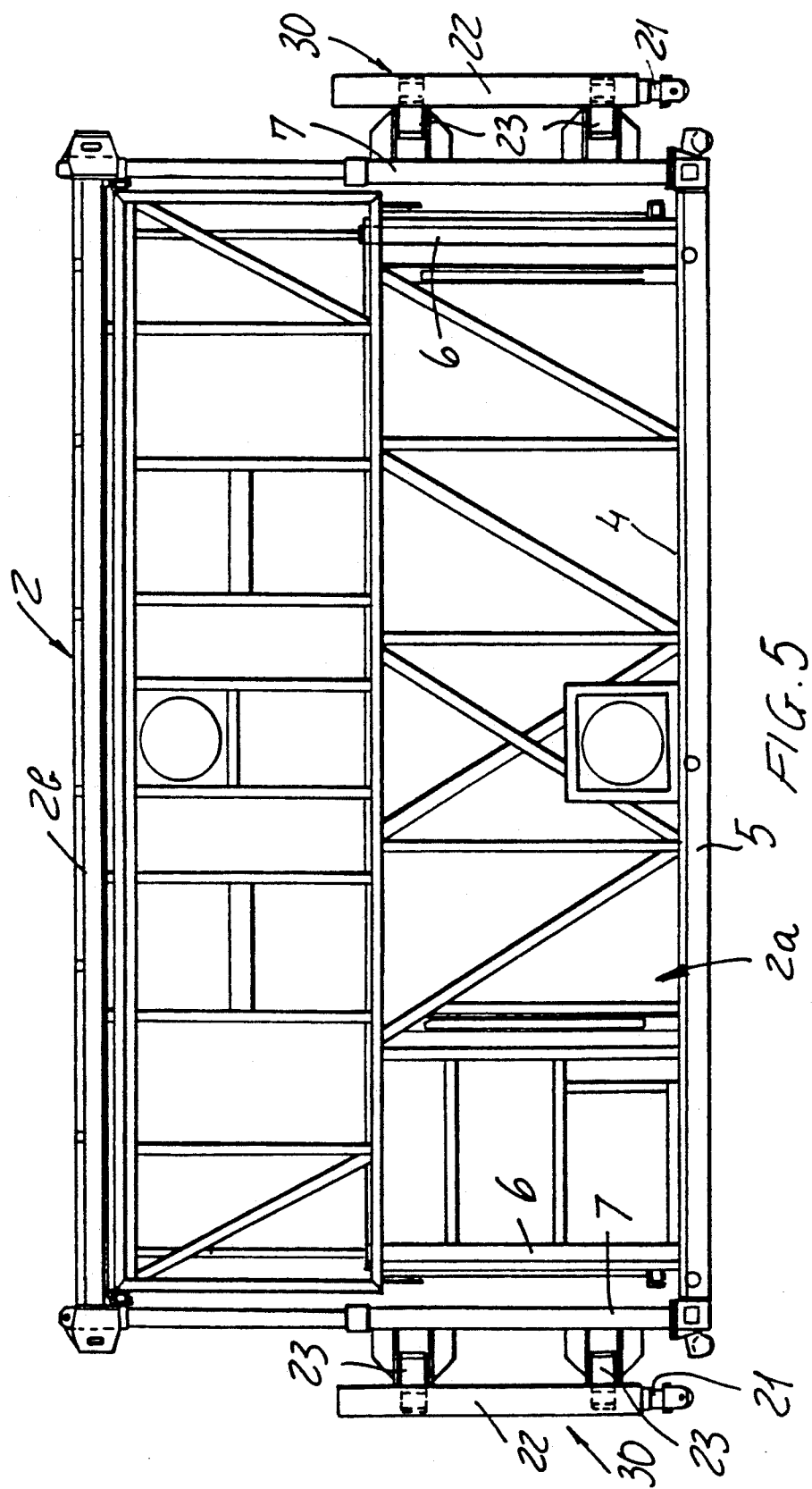

5,185,973

AIRCRAFT OR ROAD VEHICLE TRANSPORTABLE OPERATING ASSEMBLY ADAPTED TO BE TRANSFORMED INTO A FIELD HOSPITAL, OBSERVATION POST, TRANSMISSION CENTER AND THE LIKE

BACKGROUND OF THE INVENTION

The present invention relates to an aircraft or road-vehicle transportable operating assembly, adapted to be transformed into a field hospital, observation post, transmission center and the like.

There are already known several types of operating assemblies which are generally used for making field hospitals and having the common feature that they can be easily transported either by aircrafts or road vehicles.

In connection with prior field hospitals, however, as such a field hospital is to be erected, it is necessary to transport to the field several separated elements which must be successively assembled so as to provide the desired operating unit.

This, as it should be apparent, requires very long assembling times.

Another drawback is that prior field hospitals do not provide satisfactory insulation properties for assuring a perfectly aseptic inside environment.

Moreover, the above mentioned prior field hospitals have a great weight, and, accordingly, require several transportation aircrafts.

SUMMARY OF THE INVENTION

Accordingly, the main object of the present invention is to overcome the above mentioned drawbacks, by providing an operating assembly, which can be easily transported either by aircrafts or by road vehicles, and which is constructed as a complete unit of very small size, during the transporation step, while providing the possibility of covering a comparatively broad surface sufficient to house all of the equipment necessary for an efficient field hospital.

Another object of the present invention is to provide a variable-volume operating assembly which is so designed and arranged as to be easily transported also by helicopters.

Yet another object of the present invention is to provide such an operating assembly which can be easily and quickly erected and disassembled.

According to one aspect of the present invention, the above mentioned objects, as well as yet other objects, which will become more apparent hereinafter, are achieved by an aircraft or road vehicle transportable operating assembly adapted to be transformed into a field hospital, observation post, transmission center and the like, characterized in that said operating assembly comprises a central body, to which there are telescopically coupled side bodies which can be withdrawn into said central body, during a transportation step of said operating assembly, and extended from said central body during an use step of said operating assembly, there being moreover provided means for driving a trampling floor of said side bodies in order to arrange said trampling floor in a coplanar relationship with respect to a trampling floor of said central body.

BRIEF DESCRIPTION OF THE DRAWINGS

Further characteristics and advantages of the invention will become more apparent from the following detailed description of a preferred, though not exculsive, embodiment thereof, which is illustrated, by way of an indicative but not limitative example, in the figures of the accompanying drawings, where:

FIG. 1 is a schematic end view of the operating assembly according to the present invention, shown in an assembled condition;

FIG. 3 is a top plan view of the operating assembly according to the invention;

FIG. 4 is another top plan view showing a framework of the operating assembly, in a withdrawn condition;

FIG. 5 is an elevation view showing the framework of the operating assembly, in an extended condition;

DESCRIPTION OF THE PREFERRED EMBODIMENT

Figure 6:
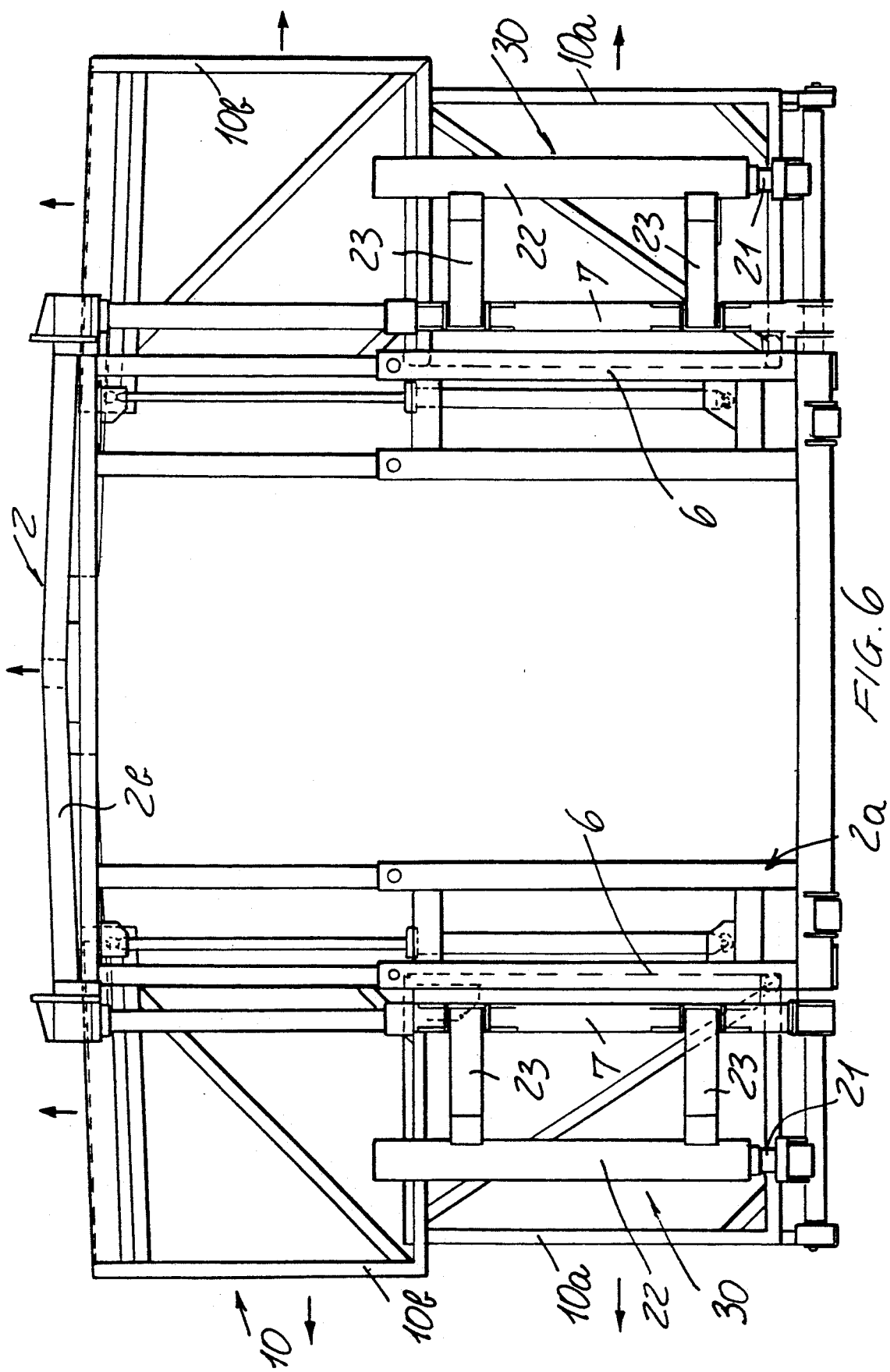
FIG. 6 is a side elevation view showing the frame of the operating assembly in an extended condition.
Figure 7:
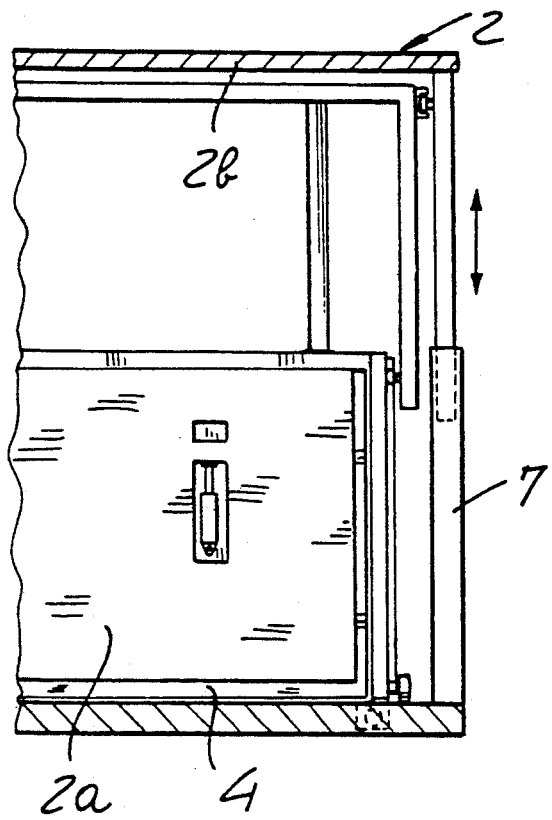
FIG. 7 schematically illustrates a procedure for extending a top portion of the operating assembly with respect to a bottom portion thereof.

With reference to the figures of the accompanying drawings, the aircraft or road vehicle transportable operating assembly adapted to be transformed into a field hospital, observation post, transmission center and the like according to the invention, comprises a main framework, including a central body 2, advantageously made of a bottom central body 2a and a top central body 2b which are vertically movable with respect to one another, and can be superimposed onto one another.

The bottom central body 2a is provided with a trampling floor 4, mounted on a supporting base 5, to which there are coupled uprights 6, thereon guide bars 7 are engaged, said bars supporting the mentioned top central body 2b which can be telescopically displaced to a desired height.

This displacement is performed by the same guide elements which operate as a raising piston.

The inlet door, which is clearly shown in FIG. 1, comprises a bottom portion 8a, associated with the bottom body 2a, and a top portion 8b, associated with the top central body 2b.

Between the bottom and top central bodies 2a and 2b there are arranged side bodies, overally indicated at the reference number 10, which are provided with a bottom portion 10a and a top portion 10b.

The bottom and top side bodies are mutually interconnected by guide pistons, indicated at the reference number 20, which are substantially arranged on the supporting base 5 of the central body so as to provide the extension movement.

Figure 8:
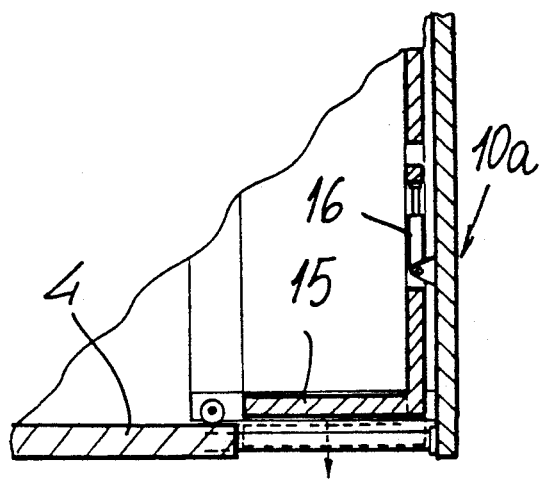
FIG. 8 is a schematic partially broken away cross sectional detail view taken at the left lower corner of FIG. 1 and showing cylinder-piston means for arranging a trampling floor of a side body of the operating assembly at a flush or leveled condition with respect to a trampling floor of the central body of the operating assembly.

The bottom side bodies 10a are provided with a trampling floor, indicated at the reference number 15 and, upon assembling, as is clearly shown in FIG. 8, can be driven by the locating pistons 16 so as to be arranged with a coplanar relationship with respect to the central body.

In their transportation condition, the side bodies are housed within the central bodies.

More specifically, the side walls of the top bodies are superimposed on the side walls of the bottom side bodies, whereas the top central body is driven toward the bottom central body so as to transform the assembly size substantially into a size of a conventional container.

During the assembling operation, by driving the pistons, which can be either of the pneumatic or of the hydraulic type, the central portion and all of the element connected to it there are telescopically raised; then the side bodies are extended.

In order to complete the construction, there are provided foot elements, indicated at the reference number 30, which are coupled to the rod 21 of a raising piston 22 supported by a swinging arm 23 having a cranked lever configuration.

More specifically, the swinging arm 23 is coupled to the bottom central body so as to rotate about a vertical axis, thereby the foot elements, in a transporation condition, are practically folded against the side end portion of the bottom body (FIG. 3), whereas, in an use condition, the foot elements are extended so as to provide a broad supporting base for supporting, at the desired height, the overall operating assembly (as it is schematically shown in FIG. 4).

Figure 9:
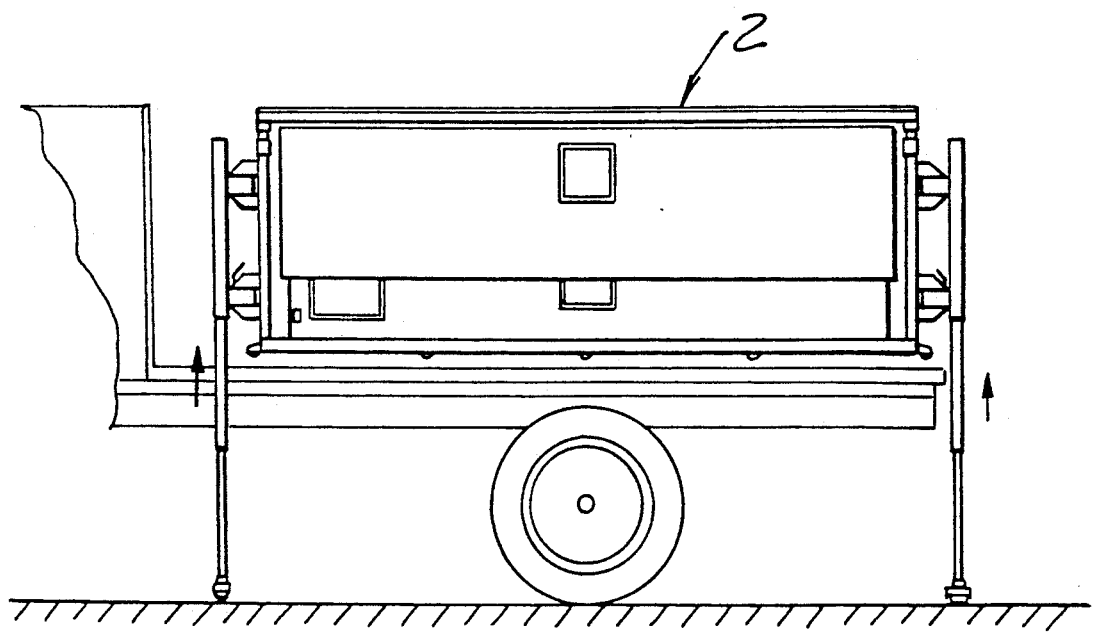
FIG. 9 schematically shows the operating assembly during a dissassembling step thereof, in which it is loaded on a road transportation vehicle.
Figure 2:
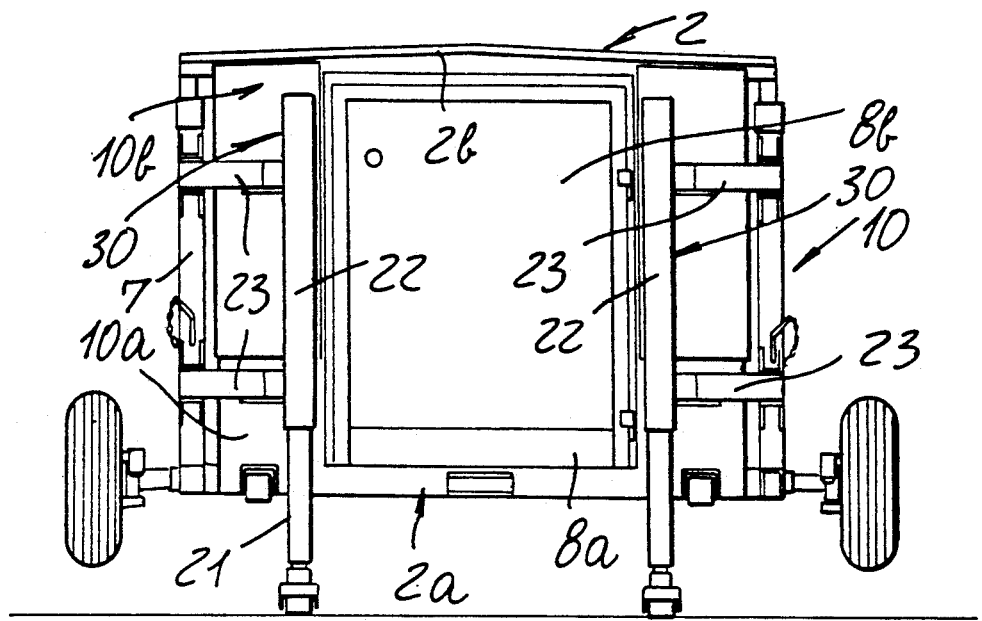
FIG. 2 is another end view showing the operating assembly according to the invention in a transportation condition.

The specifically designed construction of the foot element is such as to provide "autoloading" of the operating assembly on the loading floor of a transportation means, since said foot element can be extended to a very high level so as to exceed the height of a truck loading floor as it is schematically shown in FIG. 9.

Figure 10:
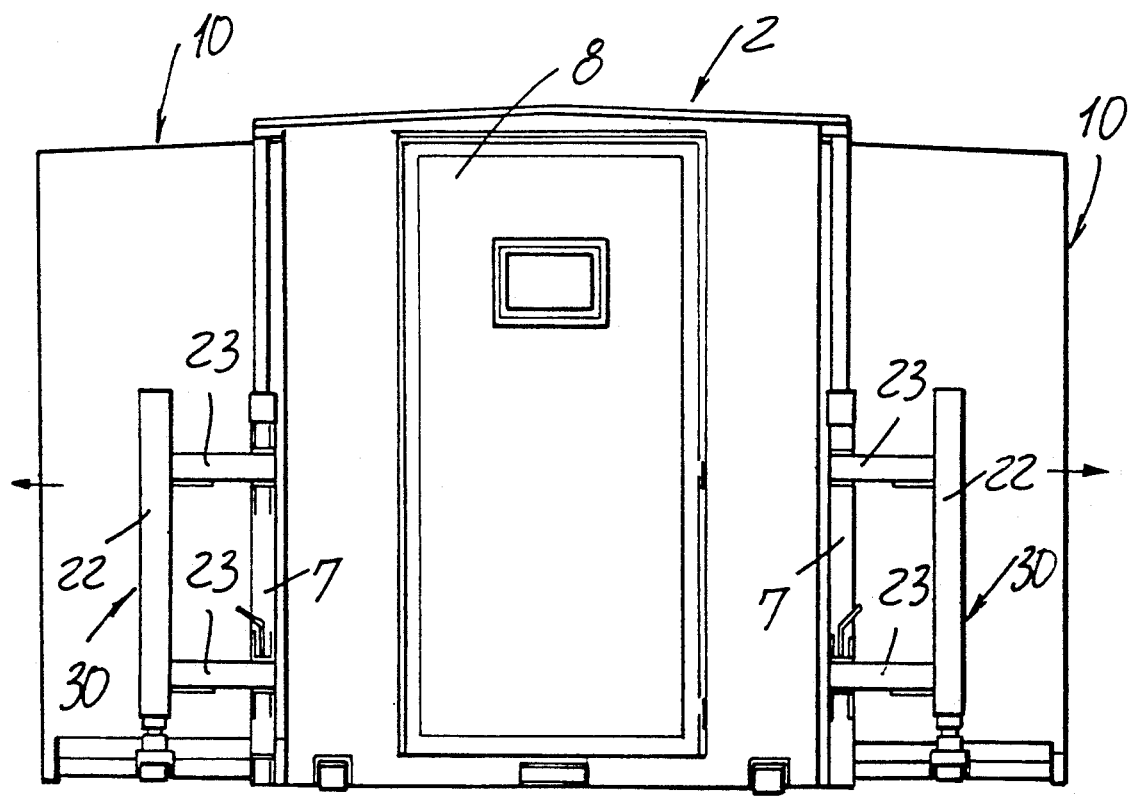
FIG. 10 is a schematic front elevation view illustrating an operating assembly having a fixed height and with the side bodies thereof at an extended condition.

With reference to FIG. 10, a simplified construction of the subject operating assembly will be disclosed which, conceptually, comprises the same features as those thereinabove illustrated, with the single difference that both the central body and the side bodies are provided at a fixed or set height, that is there is no possibility of "compacting" the component element in the vertical direction.

From the above disclosure, it should be apparent that the invention fully achieves the intended objects.

In particluar, the fact is to be pointed out that the subject operating assembly substantially comprises a container type of construction which can be expanded at the use time and in which there are already prearranged all of the required structure or equipments.

Another very important aspect of the present invention is that the subject operating assembly has a very reduced size which allows it to be easily transported by helicopters.

While the invention has been illustrated and disclosed with reference to a preferred embodiment thereof, it should be apparent that the disclosed embodiment is susceptible to many modifications and variations all of which will come within the spirit and scope of the appended claims.

I claim:

1. An aircraft or road vehicle transportable operating assembly adapted to be transformed into a field hospital, observation post, transmission center and the like, comprising a central body, two side bodies slidably coupled to said central body to be withdrawn into said central body, during a transportation step of said operating assembly, and extended from said central body during an use of said operating assembly, said central body having a central body trampling floor and each of said two side bodies having a side body trampling floor, driving means for vertically up and down driving said side body trampling floors to arrange said side body trampling floors in a coplanar relationship with respect to said central body trampling floor, said central body including a bottom central body portion and a top central body portion vertically telescopically movable with respect to one another, from a first withdrawn position to a second vertically extended position in which said top central body portion is superimposed on said bottom central body portion, each said side bodies being provided with a bottom side body portion and a top side body portion which are also telescopically coupled.

2. An operating assembly according to claim 1, wherein said assembly further comprises telescopic uprights which are rigidly coupled to said bottom central body portion, and therein there are engaged piston telescopic portions coupled to said top central body portion.

3. An operating assembly according to claim 1, wherein said bottom central body portion comprises a central body frame including a base floor supporting a trampling floor element of said bottom central body portion, said top central body portion comprising a roof portion, said base floor supporting said driving means including guiding pistons for telescopically vertically upwardly extending said side bodies.

4. An operating assembly according to claim 1, wherein said assembly further comprises an inlet door coupled at a bottom portion thereof to said bottom central body portion and, at a top portion thereof, to said top central body portion.

5. An operating assembly according to claim 1, wherein each said side body trampling floor is associated with a vertical wall portion coupled to driving pistons adapted to vertically displace each said side body trampling floor to arrange each said side body trampling floor flush with respect to said central body trampling floor.

6. An operating assembly according to claim 1, wherein said assembly further comprises floor elements coupled to a foot element piston which can slide in a cylinder associated with a cranked arm pivoted to said bottom central body portion and adapted to swing about a vertical axis.

* * * * *